UNITED STATES PATENT OFFICE.

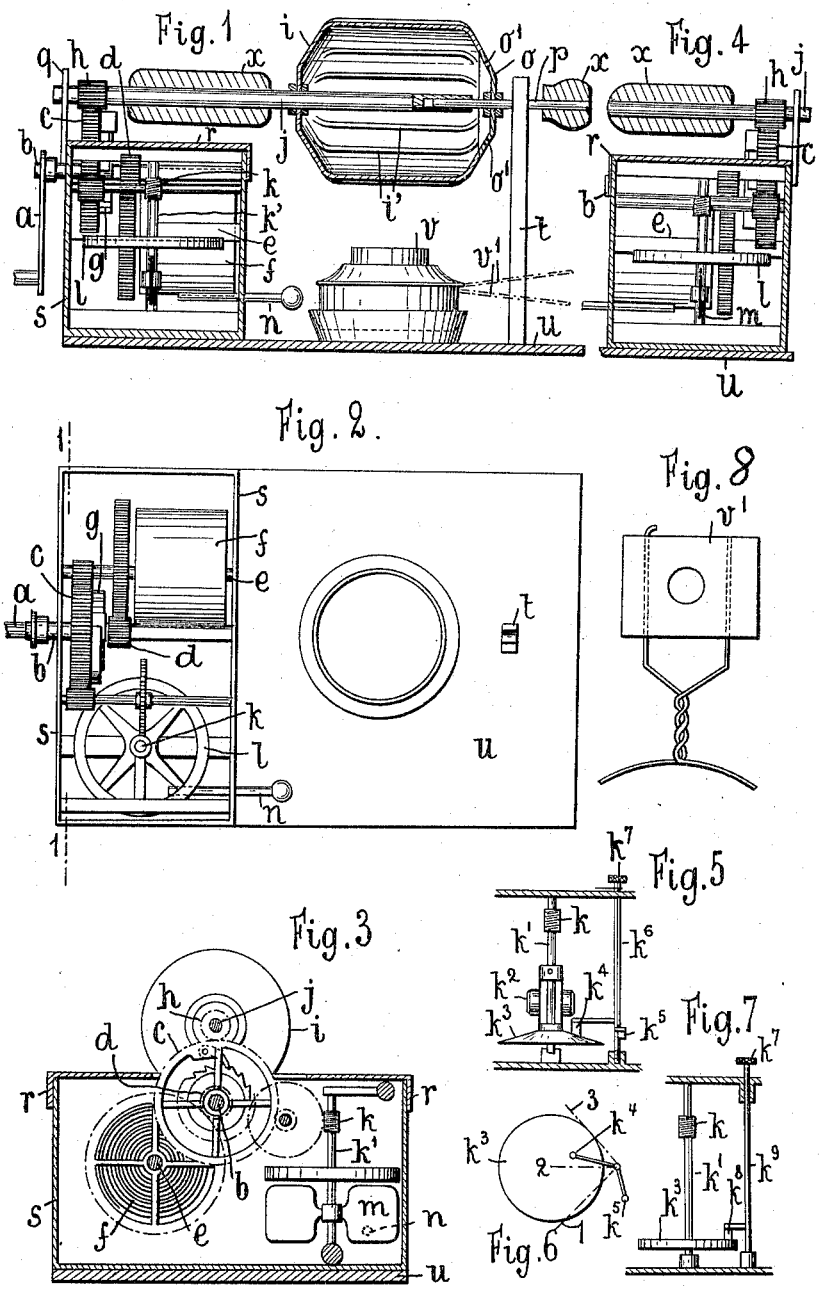

JOSEPH TREMOULHAC, OF ST.-ÉTIENNE, FRANCE.

COFFEE-ROASTER.

1,064,943. Specification of Letters Patent. Patented June 17, 1913.

Application filed May 3, 1911. Serial No. 624,764.

*To all whom it may concern:*

Be it known that I, JOSEPH TREMOULHAC, a citizen of the French Republic, residing at St.-Étienne, in the Republic of France, have invented certain new and useful Improvements in Coffee-Roasters, of which the following is a specification.

This invention relates to coffee roaster with automatical action and for household use.

In the accompanying drawings the improved apparatus is shown by way of example.

Figure 1 is an elevation of the apparatus partly in longitudinal section. Fig. 2 is a plan view, the lid of the casing as well as the roasting drum being removed. Fig. 3 is a cross section on the line 1—1 of Fig. 2. Fig. 4 represents the clockwork for driving the roasting drum. Figs. 5 and 6 are respectively an elevation and a plan of a governor connected with said clockwork. Fig. 7 shows an apparatus similar to that shown in Fig. 5 but without centrifugal balls. Fig. 8 shows on a larger scale one of the lateral arms of the heating device.

The mechanism for driving the roasting drum can consist of a clockwork such as shown, by way of example, in the accompanying drawings. The winding up of the clockwork is effected by means of the crank handle $a$ mounted upon the shaft $b$ on which the spur wheel $c$ and the pinion $d$ are keyed. This pinion $d$ meshes with a pinion keyed upon the shaft $e$ on which the spring $f$ is mounted. A locking mechanism $g$ fixed against the wheel $c$ insures the rotation of the shaft $b$ when the spring is unwinding, said revolving motion being communicated by the pinion $h$ to the roasting drum $i$ mounted upon the shaft $j$. The revolving motion is further transmitted by suitable gearing to a worm $k$ carried by the vertical axle $k'$ upon which a fly wheel $l$ is mounted. Upon the axle there are further mounted the blades $m$ which are movable on their hubs in order to adopt either a vertical position or a horizontal position for acting upon the rod $n$. These movable blades serve for varying the revolving speed according to their position.

The roasting drum $i$ which is made of very thin sheet-copper may have the shape represented in the drawing; it has inner extensions or ribs $i'$ which serve for better mixing the coffee grains during the rotation of the drum. The lid $o$ of the roasting drum has openings $o'$ through which the vapors escape which are generated by the roasting. The lid $o$ is mounted upon a shaft $p$ the end of which is split so that it acts like a spring and is inserted in the hollow end of the axle $j$ whereby the shaft of the roasting drum is completed. The arrangement of the lid as described facilitates the filling in and the removal of the coffee.

The roasting drum is supported on the one hand by a blade spring $q$ bearing against the end wall of the metal casing $s$ and on the other hand by an upright $t$ fixed upon the base plate $u$ of the apparatus. Under the roasting drum a heating device $v$ is mounted upon said base plate $u$. The lamp or heating device $v$ has two lateral elastic arms $v'$ which have holes and are pushed over the upright $t$ so that said heating device can be maintained at any suitable position.

The upper ends of the blade spring $q$ and of the upright $t$ are slit in order to facilitate the removal of the roasting drum. Wooden handles $x$ fixed upon the shaft of said drum protect the hands of the operator from the heat.

The governor or regulating device can be constructed either as shown in Figs. 5 and 6 or as shown in Fig. 7. Upon the shaft $k'$ the centrifugal balls $k^2$ of the governor are movably mounted in the well known manner so that they can move away from said shaft when its speed increases, lifting at the same time the friction cone $k^3$. The friction brake $k^4$ acting upon the said friction cone $k^3$ limits the movement of the centrifugal governor its position No. 1 corresponding to the slow speed and that No. 2 to the high speed. In the position No. 3 the friction cone is stopped by means of the friction arm $k^5$ carried by the shaft $k^6$ and adapted to be regulated by the hand knob $k^7$. Fig. 7 represents a similar governor without centrifugal balls, the friction cone $k^3$ being submitted to a more or less energetic friction of the friction arm $k^8$ mounted upon the threaded spindle $k^9$.

This apparatus can be made in different forms and dimensions according to the efficiency to be obtained.

I claim:—

An improved coffee roaster for household use with automatic operation comprising in combination a casing having a base plate, a heating device upon the base plate of said casing, a roasting drum removably mounted in the casing above said heating device, a standard upon said base plate having a bearing at its top, the shaft of said roasting drum composed of two removably connected parts mounted in the bearing of said standard, a removable lid of said roasting drum fixed to one of said parts of the shaft, a clockwork mounted in said casing and serving for driving said shaft of the roasting drum, blades movable on their hub mounted upon the shaft of the clockwork, a centrifugal governor for regulating the speed of the shaft of the roasting drum, and adjustable means for regulating the speed of said governor, substantially as described and shown and for the purpose set forth.

In witness whereof I have hereunto set my hand in the presence of two witnesses.

JOSEPH TREMOULHAC.

Witnesses:
LOUIS SARNIN,
JIBERT JEAN MARIE.

Copies of this patent may be obtained for five cents each, by addressing the "Commissioner of Patents, Washington, D. C."